(12) United States Patent
Forrester

(10) Patent No.: US 7,447,286 B2
(45) Date of Patent: Nov. 4, 2008

(54) ADAPTIVE DIRECT CONVERSION RECEIVER

(75) Inventor: Tim Forrester, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 28 days.

(21) Appl. No.: 11/427,698

(22) Filed: Jun. 29, 2006

(65) Prior Publication Data

US 2006/0239382 A1 Oct. 26, 2006

Related U.S. Application Data

(63) Continuation of application No. 10/131,166, filed on Apr. 23, 2002, now Pat. No. 7,072,424.

(51) Int. Cl.
H03D 1/04 (2006.01)

(52) U.S. Cl. ...................................... 375/346

(58) Field of Classification Search ................ 375/316, 375/345, 346, 377, 348, 349, 317, 319, 338, 375/339, 340, 259, 285, 344; 455/130, 150.1, 455/170.1, 324, 177.1, 323, 313–316, 296, 455/39, 67.11, 67.13, 161.1, 161.3, 196.1, 455/230, 255
See application file for complete search history.

(56) References Cited

U.S. PATENT DOCUMENTS

| | | | |
|---|---|---|---|
| 4,464,770 A | 8/1984 | Maurer et al. | |
| 4,817,167 A | 3/1989 | Gassmann | |
| 5,001,776 A * | 3/1991 | Clark | 455/226.2 |
| 5,414,736 A | 5/1995 | Hasegawa et al. | |
| 5,564,094 A * | 10/1996 | Anderson et al. | 455/295 |
| 5,606,731 A | 2/1997 | Pace et al. | |
| 5,758,271 A | 5/1998 | Rich et al. | |
| 5,815,821 A * | 9/1998 | Pettersson | 455/574 |
| 5,953,646 A * | 9/1999 | Hirasawa | 455/343.2 |
| 6,226,504 B1 | 5/2001 | Takagi | |
| 6,404,760 B1 | 6/2002 | Holtzman et al. | |
| 6,459,889 B1 | 10/2002 | Ruelke | |
| 6,564,043 B2 * | 5/2003 | Rauhala | 455/251.1 |
| 6,670,901 B2 | 12/2003 | Brueske et al. | |
| 6,694,131 B1 | 2/2004 | Lakkis | |
| 6,775,336 B1 | 8/2004 | Takaki | |
| 6,901,121 B1 | 5/2005 | Dubrovin et al. | |
| 6,941,121 B2 | 9/2005 | Chen | |
| 6,965,655 B1 * | 11/2005 | Mostov et al. | 375/345 |
| 7,130,359 B2 * | 10/2006 | Rahman | 375/316 |
| 2002/0128039 A1 | 9/2002 | Finn | |
| 2002/0142745 A1 | 10/2002 | Kang et al. | |
| 2003/0003891 A1 | 1/2003 | Kivekas et al. | |
| 2003/0207674 A1 | 11/2003 | Hughes | |

* cited by examiner

*Primary Examiner*—Mohammad H Ghayour
*Assistant Examiner*—Vineeta S Panwalkar

(57) ABSTRACT

A method and apparatus is disclosed for improving performance of a communication receiver. An exemplary method comprises calculating a rate of error associated with a received signal at a first time; comparing the rate of error at the first time to a first threshold rate of error; if the rate of error at the first time exceeds the first threshold rate of error, increasing current provided to a mixer in the receiver; calculating a rate of error associated with a received signal at a second time; comparing the rate of error at the second time to a second threshold rate of error; and if the rate of error at the second time is less than the second threshold rate of error, resetting the mixer current.

5 Claims, 8 Drawing Sheets

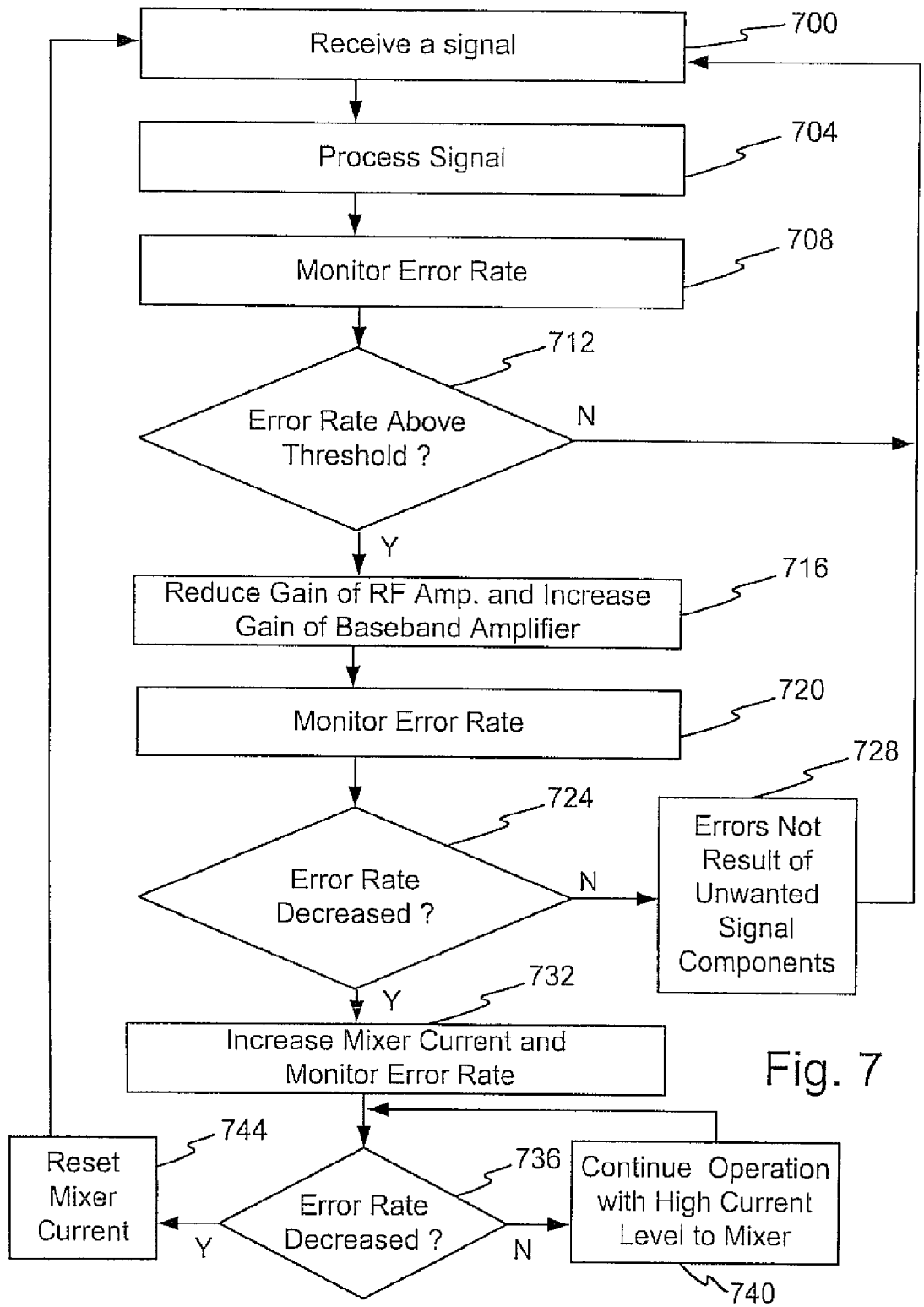

ADAPTIVE DIRECT CONVERSION RECEIVER

RELATED APPLICATIONS

This is a continuation of U.S. application Ser. No. 10/131,166, filed Apr. 23, 2002, now U.S. Pat. No. 7,072,424 which is hereby incorporated by reference.

FIELD OF THE INVENTION

The present invention relates to communication receivers and in particular to direct conversion receivers.

BACKGROUND

Electronic communication is a popular form of exchanging information between locations. When transmitting voice or data information it is generally desirable to maximize the amount of information within a particular frequency band and minimize the error rate. This is true of both wireless and non-wireless applications.

To most efficiently utilize available bandwidth, communication standards often specify maximum transmit power levels and minimum separation between channels. As a result, challenges exist during signal demodulation and signal recovery. Certain demodulation and signal recovery operations, while effective, consume power at a high rate. While power consumption is a relevant consideration in any type receiver, battery operated communication receivers are particularly sensitive to power usage issues. One example of a battery operation communication receiver is a receiver in a wireless telephone, such as for example a cellular telephone.

In addition to power usage constraints, the cost and performance of the receiver is also a consideration. By way of example, superheterodyne receivers are a widely adopted configuration for wireless communication receivers. However, as compared to a direct conversion or near zero IF (hereinafter referred to as direct conversion) receiver, superheterodyne receivers are undesirably expensive. As a result, direct conversion receivers offer performance at a lower cost per unit than superheterodyne receivers. A superheterodyne receiver mixes the RF signal down to an intermediate frequency (IF) and eventually down to baseband. In contrast to superheterodyne receivers, direct conversion receivers demodulate the received signal from the carrier frequency to the baseband without use or passage through an intermediate frequency (IF). By eliminating hardware required to process the signal through the intermediate frequency, the cost of the direct conversion receiver is reduced.

While direct conversion receivers of the prior art enjoy cost advantages over superheterodyne receivers, their use has drawbacks. One such drawback is a susceptibility to signal interference from unwanted extraneous signals, or jammers. Because the direct conversion receiver does not demodulate and filter at an intermediate frequency unwanted signals may follow a signal of interest to the baseband. These unwanted signals may interfere with signal reception, decoding, and processing thereby disrupting a user's ability to use the communication device or channel. In some instances a cellular telephone system may drop the call due to the interference from the unwanted signal. These interfering signals need not be on adjacent or alternate channels to cause interference to the demodulated desired signal. This is because one source of unwanted signal disruption is generated within the receiver's demodulator by means of second order distortion products in the down mixer (or demodulator) itself. Therefore any two or more signals in the band as a whole but spaced apart by a frequency equal to or less than the desired signal bandwidth may generate a second order interfering signal at baseband. Thus the ability to minimize second order products in the receive chain is of vital importance.

An additional drawback of the prior art was an inability to determine the cause of the poor reception. The poor reception may arise from a weak signal or an unwanted interfering signal being generated by second order products within the receiver.

Therefore, there is a need in the art for a communication receiver that adopts the benefits of a direct conversion receiver (i.e., lower cost, fewer components, and lower power consumption) yet reduces the undesirable effects of the unwanted signals that may demodulate into the baseband. There is also a need for a method and apparatus to aid in determining the reason for the poor reception.

SUMMARY

The methods and apparatus described below provide a solution for drawbacks that exist in the field of wireless communication receivers. In an example system comprising a direct conversion receiver an interference signal may be received with the desired signal In the past this type of problem caused the error rate, such as the bit error rate (BER), to undesirably increase. Some proposed solutions, in attempt to improve receiver linearity and thus reduce internally generated interference, force the receiver to permanently operate in a state of high power consumption. While this may increase performance, the increased power consumption resulting from permanent operation in a state of high power consumption undesirably reduces battery life. Reduced battery life results in reduced talk time and reduced standby time.

To overcome the problems associated with the prior art and to provide additional advantages in signal reception the method and apparatus described herein is able to identify the reason or cause of the high error rate. After determining the cause of the high error rate, the method and apparatus described herein may selectively process the signal to reduce the error rate. It is contemplated that selective processing will occur during periods when such selective processing will reduce the error rate.

Various steps may be taken to reduce the error rate. In one embodiment the current supplied to the mixer is increased to thereby reduce second order blocking products. Further, when the mixer is operating in a high current consumption state the receiver may periodically or continuously monitors the error rate. If the error rate has decreased sufficiently, such as below a threshold, the demodulator operation returns to normal current consumption levels. This provides the benefit of only operating the demodulator in a high current state during periods when high current operation is necessary to reduce the error rate. If, as a result of the monitoring, the error rate has not decreased below a threshold, then the demodulator continues high current operation. In this manner the system monitors the error rate and high current demodulator operation only occurs when the error rate is undesirably high and when the cause of the high error rate is such that the error rate would be reduced by the steps described herein.

In one embodiment the error rate may be further monitored to determine if additional steps should be taken to reduce the error rate. This provides the advantage of further reducing the error rate and hence improving reception and reducing the likelihood of a call being dropped. In one embodiment the receiver is further configured to reduce the error rate by monitoring and adjusting the phase offset, balance or both of one or more aspects of the receiver.

During processing it is often beneficial to split the received signal into separate components. For example some receivers separate a received signal into I and Q components, which are 90 degrees out of phase. Using one aspect of the invention the phase offset of the two or more signal components are monitored and adjusted to bring the signal components to the exact desired phase offset. In one embodiment a phase splitter, mixer, and/or automatic gain control unit are monitored and adjusted to insure proper phase offset. In another embodiment the inherent balance of each mixer, which forms part of the demodulator, is adjusted to provide cancellation of the second order products. Through the use of proper phase offset and amplitude matching the full canceling effects of a split phase system may be realized. This adaptive balancing function effectively increases the receivers second order intercept point and thus reduces the internal generation of second order distortion products which might otherwise interfere with the desired signals' demodulation within the DSP.

The method and apparatus described herein provides numerous advantages over systems of the prior art. In one embodiment these advantages are realized with a direct conversion receiver. Direct conversion receivers provide a lower cost alternative to superheterodyne receivers. In contrast to systems of the prior art, one embodiment of the invention is able to determine when the receiver is experiencing a high error rate. In one embodiment action is taken to reduce the high error rate only during periods of a high error rate. By selectively taking action to reduce the error rate only when the error rate is undesirably high, instances of high power consumption may be reduced.

Yet another advantage of the invention is its ability to determine the cause of a high error rate. By determining the cause of the high error rate changes in receiver operation can selectively occur so that changes in receiver operation only occur when the change in receiver operation will reduce the error rate. It is contemplated that in some instances the high error rate can not be reduced. In such an instance, there is no need to increase power consumption of the receiver, such as increasing the current supplied to the mixer, since such increased power consumption would not reduce the error rate. Thus, in one embodiment the receiver operates in an error reducing high power consumption state only when such operation will reduce the error rate.

Yet another advantage of the method and apparatus described herein is that as a result of monitoring the error rate during periods in a high current consumption such periods may be limited to periods 1) when the receiver is producing a high error rate and/or 2) when operation in a high current consumption state will reduce the error. Thus, in one embodiment the receiver, during periods of increased power consumption to counter a high error rate, periodically monitors the error rate. If the error rate is reduced below a desired level, then the receiver will resume operation at normal or low power consumption levels. As a result of the invention, standby and talk time of wireless telephones are extended beyond those of the prior art while concurrently gaining the benefits of a direct conversion receiver and reduced error rate.

BRIEF DESCRIPTION OF THE DRAWINGS

FIG. 7 illustrates an operational flow diagram of an example method of selective error reduction.

DETAILED DESCRIPTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention. In addition, the various aspects or embodiments described herein may be implemented alone or in any combination.

Figure 1:
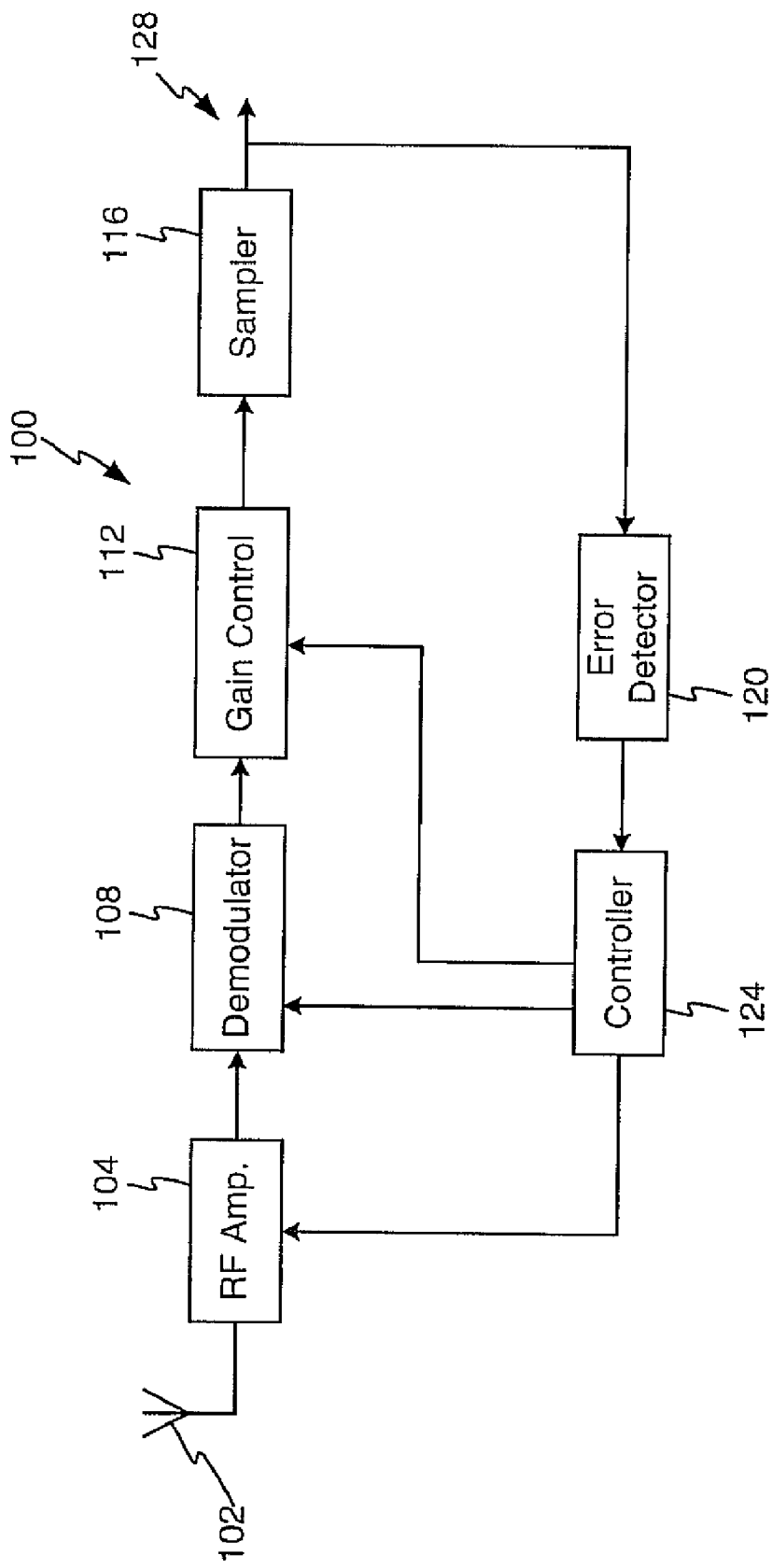
FIG. 1 illustrates a block diagram of an example embodiment of the invention.

FIG. 1 illustrates a block diagram of an example embodiment of the invention. In this example embodiment a receiver 100 is configured for use in a wireless communication device. The receiver 100 comprises an antenna 102 connected to a high frequency amplifier 104. In the embodiment of FIG. 1 the high frequency amplifier 104 is a radio frequency amplifier. The output of the RF amplifier 104 feeds into a demodulator 108 and the output of the demodulator is provided to a gain control unit 112. The gain control unit couples to a sampler 116. The output of the sampler 116, which is provided on an output 128, is subject to further processing in apparatus subsequent to the receiver 100.

In operation the antenna receives a signal traveling through the air, converts the signal energy to an electrical energy form and directs the signal to the RF amplifier 104. The RF amplifier 104 may include a filtering system to insure only a band or range of desired frequencies are amplified. The RF amplifier 104 increases the signal magnitude to a level suitable for processing by the receiver 100. As is understood, signal processing at high frequency is generally undesirable. Accordingly, the demodulator 108 converts the high frequency carrier signal a signal at baseband. In one embodiment the receiver 100 comprises a direct conversion receiver. In a direct conversion receiver, the single demodulator 108 converts the signal to baseband.

The demodulated signal is provided to the gain control 112. In one embodiment the gain control comprises an automatic gain control (AGC) unit designed to adjust the baseband signal level to a level appropriate for the sampler 116. The sampler 116 is configured to sample the analog signal to thereby generate a digital version of the received signal. One example of the sampler 116 is a 12 bit analog to digital converter, however, there are many other implementations of an analog to digital converter. Digital signals may be desirable for use in communication systems to provide advantages not available in analog systems.

Figure 2:
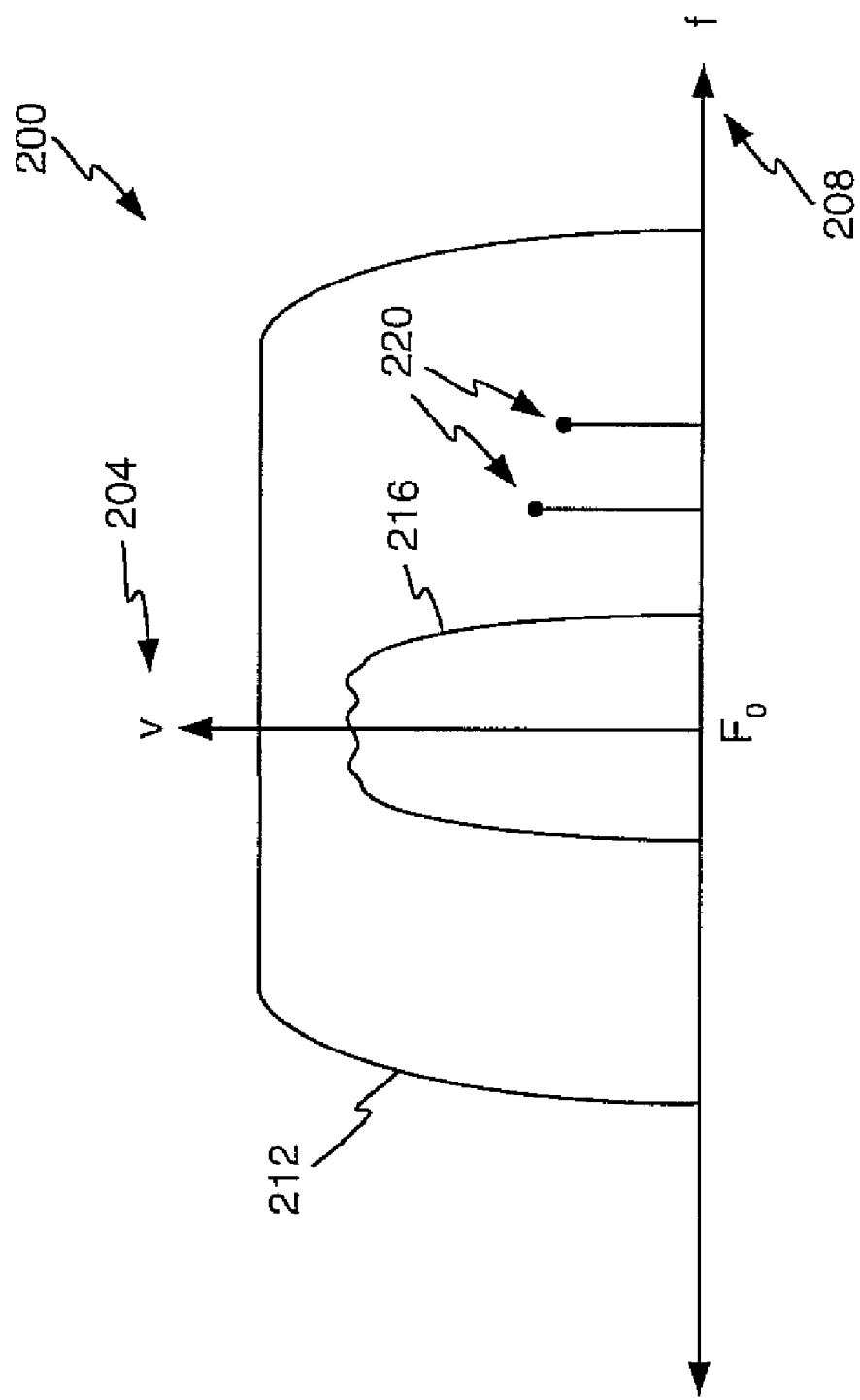
FIG. 2 illustrates an exemplary plot of exemplary communication signals within a radio frequency amplifier's frequency pass band.

It is contemplated that in some instances the antenna 102 may receive and provide signals to the RF amplifier that contain unwanted or spurious signal portions located within the amplification band of the RF amplifier 104. FIG. 2 illustrates an example plot 200 of components of a received signal located within a filter or RF amplifier's frequency pass band. Voltage magnitude is represented on a vertical axis 204 while frequency is represented on a horizontal axis 208. The amplifier or filter pass band 212 allows a signal of interest 216 to pass or be amplified. However, as can be seen the amplifier or filter also passes unwanted signal portions 220. These signal portions pass to subsequent stages of the receiver and may interfere with intended receiver operation and signal recovery. Hence, it is desired to eliminate or reduce the effects of the unwanted signals 220.

To detect the presence of or overcome the undesirable effects of the unwanted signals 220 the embodiment of FIG. 1 includes error monitoring and receiver control systems. Returning to FIG. 1, the output of the sampler 116 is provided to an error detector 120. The error detector 120 provides a signal to a controller 124 and in this exemplary embodiment the controller may provide control signals to any one or more of the RF amplifier 104, the demodulator 108, and the gain control 112. Additional components may be interspersed among the shown apparatus to facilitate operation of the receiver as would be understood by one of ordinary skill in the art.

To achieve the advantages of the monitoring and receiver control systems 120, 124 the error detector 120 is configured to monitor and process the output signal to determine an error rate. In one embodiment the error detector 120 monitors a bit error rate (BER). If the error rate exceeds a predetermined level, it notifies the controller to provide control signals to the RF amplifier 104, demodulator 108, and/or gain control 112. Through control of one or more of these apparatus and further monitoring of the sampler output by the error detector 120 the controller 124 can determine if the cause of the high error rate is from the unwanted signal portions 220. In some instances unwanted signal portions 220 may be responsible for a high error rate while in other instances other factors, such as a weak signal, may be responsible. If the higher error rate is a result of an unwanted signal, such as interference or a jammer, then steps may be taken to reduce the error rate.

In one embodiment, upon detection of a high error rate the controller reduces the amplification level of the RF amplifier 104 by a minimal amount, for example, 1 db, while optionally increasing the gain of the gain controlled 112 by a minimal level, such as for example the same minimal level. This has the effect of reducing the second order distortion products generated by the jammers 220 in the demodulator 108 by 2 dB while leaving the wanted signal at worst degraded by 1 dB. Thus the signal jammer ratio has been improved by at least 1 dB. It, as a result of this manipulation, the error rate decreases then the high error rate can be assumed to be a result of the unwanted signal portions generating second order distortion in the down converters associated with demodulator 108. Action can then be taken to reduce the high error rate. In contrast, if the error rate is unchanged then the high error rate can be assumed to not be a result of the unwanted signal portions. In this manner a determination is made as to the source or cause of the high error rate. Action can be taken to reduce the error rate based on this analysis.

By way of example if the high error rate is a result of the unwanted signal portions then the method and apparatus described below may be implemented. If instead the source of the high error rate is not the unwanted signal portions then other remedial action may be taken. These actions include, but are not limited to, increasing transmit power by the Base Station transmitter or other transmitter, transferring the call to a different cell site, adjusting phase offset, increasing RF amplifier amplification level, extending the phone's antenna, or moving to a different location.

One exemplary remedial action that may be taken if the high error rate is a result of the unwanted signal portions is to provide control signals to the demodulator 108 to process the signal in a manner that more thoroughly removes or reduces the second order distortion products generated in one or more of the mixers by the unwanted signal portions. In one embodiment this comprises increasing a current level provided to one or more mixers in the demodulator 108. While such increased current desirably reduces the unwanted signal portions it undesirably increases power consumption.

To overcome the drawback of increased power consumption the controller 124 and error detector 120 may continually or periodically monitor the error rate. Upon a decrease in the error rate the current supplied to the demodulator may be reduced to thereby reduce the amount of time the mixers operate in a high current state. In one embodiment a comparison to a first threshold value controls when error reducing steps are initiated and comparison to a second threshold value controls when error reducing steps are de-activated. A second threshold, which is different from first threshold, may be used during the comparison to prevent the system from hunting or oscillating between high and normal current states. In one embodiment the controller may briefly stop supplying increased levels of current to the demodulator to obtain accurate error level information that is not otherwise effected by the increased current level supplied to a mixer. It is contemplated that additional error reducing steps may be taken by the receiver 100 upon detection of a high rate of error. While these steps may increase power consumption, continual or periodic monitoring occurs to minimize the power consumption. Upon detection of the error rate falling below a first or a second threshold the steps may be deactivated thereby restoring power usage to normal levels.

Figure 3:
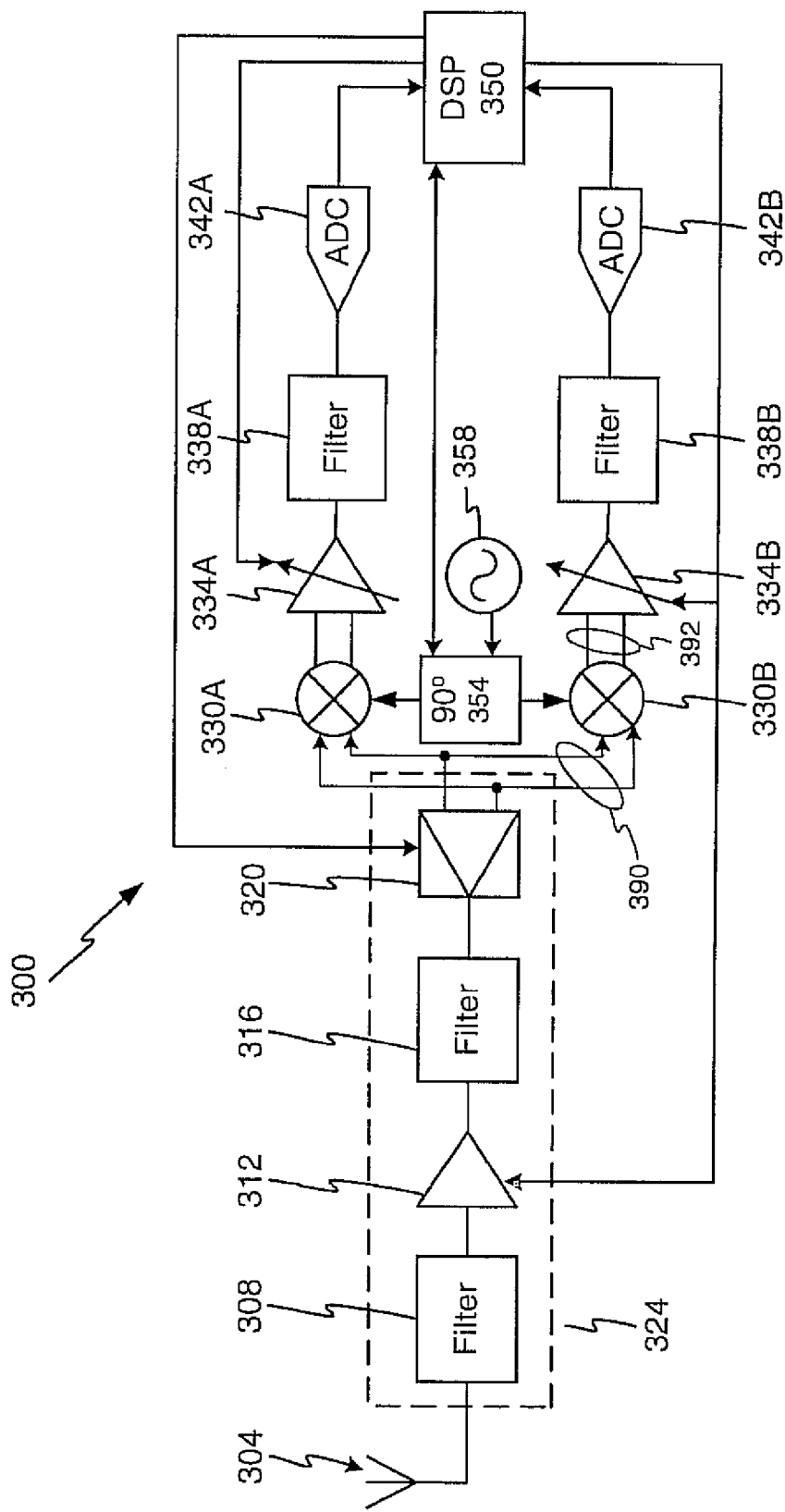
FIG. 3 illustrates a block diagram of an example configuration of one embodiment of the invention.

FIG. 3 illustrates an example implementation of the embodiment shown in FIG. 1. In this example embodiment the receiver 300 comprises a direct conversion receiver. As shown, an antenna 304 connects to a filter 308. The antenna 304 and filter 308 receive and isolate a desired signal. In one embodiment the filter 308 is configured as a band pass filter configured to pass a select frequency band to subsequent stages of the receiver. The output of the filter 308 provides the signal to a low noise amplifier (LNA) 312. The LNA 312 increases the power level of the signal to bring the low power signal received by the antenna 304 to a level appropriate for processing by the receiver 300. The output of the LNA 312 connects to a second bandpass filter 316. The bandpass filter 316 removes any DC bias or high frequency noise that is outside of the frequency band of interest. It is contemplated that any type filter 308 or 316 may be utilized.

A signal splitter 320 connects to and receives the output of the second bandpass filter 316. Any type signal splitter 320 may be adopted for use. The signal splitter 320 produces, from a single signal or wave input, two or more output signals that offer acceptable phase and amplitude matching. In the embodiment shown in FIG. 3 the signal splitter 320 is configured to separate the signal into two separate paths, shown on lines 390, which are phase shifted apart by 180 degrees and amplitude matched, In one embodiment the components 308, 312, 316, and 320 are collectively combined into a single device such as a low noise amplifier with amplitude and phase splitting capability, the phase splitting function being provided by a differential output from filter 316. This combination is shown inside dashed line 324. It should be noted that although one particular embodiment is shown in FIG. 3, the scope of the invention is not limited to this embodiment. One of ordinary skill in the art may envision other combinations or embodiments which are covered by the claims that follow.

The dual output of the phase splitter 320 feeds into an upper receiver branch and a lower receiver branch. As these branches are generally identical the two branches are described in unison. Differences, if any, are noted when present. Mixers 330A, 330B receive signals on lines 390 from the splitter 320 as shown. The inputs to the mixers 330A, 330B and the outputs from the mixers are balanced. The mixers 330A, 330B also receive inputs from a frequency divider 354, which in turn receives input from a signal generator 358. The divider 354 and generator 358 are collectively referred to as a local oscillator. In one embodiment the signal generator 358 creates a signal that is generally identical to but at twice the frequency of the carrier signal or some other multiple thereof. Use of the divider 354 helps to insure that the signals provided to the mixers 330A, 330B are of the same magnitude and exactly 90 degrees out of phase, yet phase related to those signals provided by the signal generator 358. Further, the divide ratio need not be constrained to integer values. Indeed there are other benefits to using non-integer divide ratios.

The balanced outputs from the mixers 330A, 330B feed into automatic gain control (AGC) devices 334A, 334B via connections 392. The output of the AGC devices 334A, 334B connect to bandpass filters 338A, 338B. The AGC devices 334A, 334B and filters 338A, 338B operate to provide signals of appropriate amplitude and frequency content to analog to digital converters (ADC) 342A, 342B. As is understood, some analog to digital converters 342A, 342B must receive a signal within a limited voltage range as specified for the analog to digital converter. Any type of matched AGC 334A, 334B and filter 338A, 338B may be utilized to provide a signal within the desired amplitude to the ADC 342A, 342B. In one embodiment sampling of the signal occurs at 2000 KHz with 10 bits of resolution. In another embodiment the ADC 342A, 342B are configured to accept signals having a wide voltage range and hence the AGC 334A, 334B and filter 338A, 338B may be eliminated.

The outputs of the ADC 342A, 342B connect to a digital signal processor (DSP) 350. In other embodiments the DSP 350 may be replaced by any type processor, control logic, ASIC type processing system or other components capable of analyzing or changing one or more signals, device settings, device parameters or other aspects of circuit operation, and generating control or other type signals in response to the analysis. The DSP 350 is configured to receive and process the digital output from the ADC 342A, 342B. Any type processing may be performed as desired for communication signal analysis or as may be contemplated by one of ordinary skill in the art. While discussion of the DSP 350 is limited to aspects which are relevant to the invention, in use the DSP may be assigned any processing task.

In one embodiment the DSP 350 also connects to or communicates with one or more of the LNA 312, the mixers 330A, 330B, and the AGC 334A, 334B. In the embodiment of FIG. 3 the DSP 350 also connects to the splitter 320, and local oscillator devices 354, 358. Via the connection to the LNA 312 and the AGC 334A, 334B the DSP 350 may independently monitor and/or adjust the level of gain for either or both device. Via the connection to the mixers 330A, 330B the DSP 350 may monitor and control the amount of current provided to the mixers. Via the connection to the splitter 320, local oscillator devices 354, 358, and the mixers 330A, 330B the DSP 350 may monitor and/or adjust the level of phase offset between the upper and lower paths of the receiver.

To overcome the drawbacks of the prior art and provide further innovations, the DSP 350 is configured to monitor the error rate of the received signal. One measure of an error rate is the bit error rate, which for purposes of discussion is used in the following description to refer to error rate. A large BER is understood to be undesirable. One drawback of systems of the prior art is difficulty in determining why a high BER is occurring. Because different action to remedy the high BER may be necessary depending upon the cause of the high BER, it is desirable to determine the cause of the high BER. After the cause of the high error rate is determined, appropriate error reducing action may be taken. The method and apparatus described herein may be made to determine the cause of the high BER by adjusting the gain of one or more amplifiers and monitoring for a change in the BER. If, after such adjustment, the BER changes then the reason for the high BER may be determined.

Figure 4:
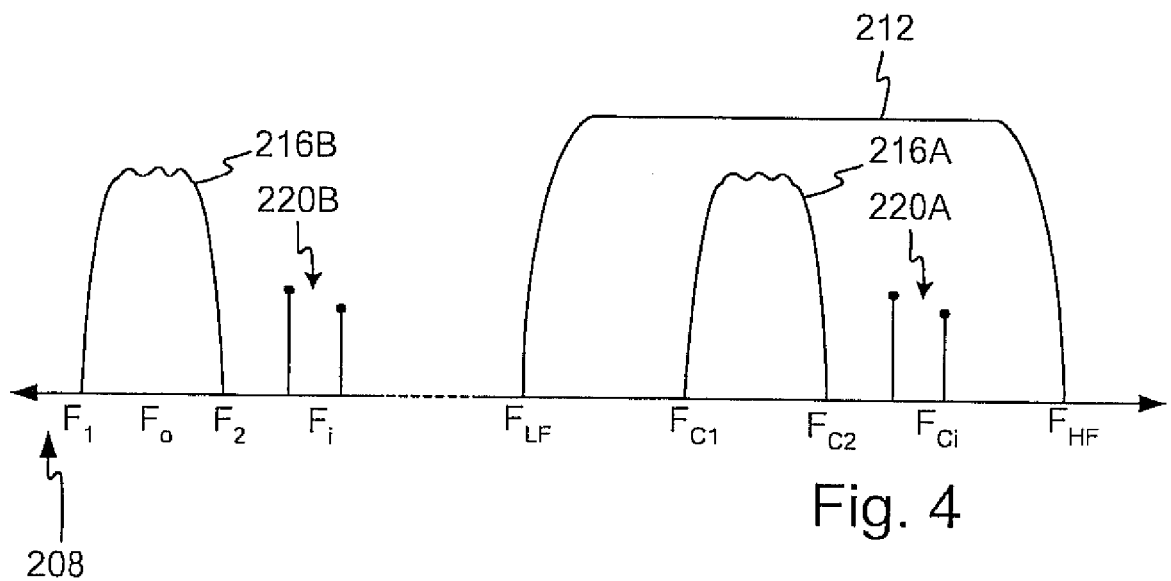
FIG. 4 illustrates an exemplary plot of an example communication signal in the baseband and the RF band with associated unwanted signal components.
Figure 5A:
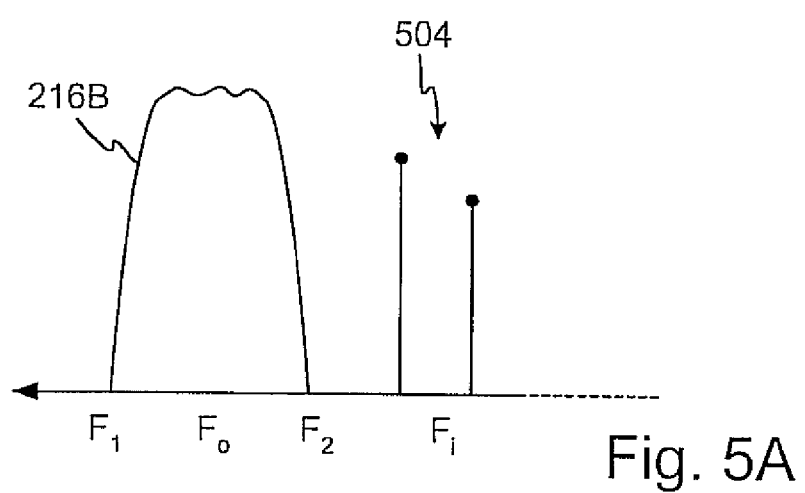
FIG. 5A illustrates an exemplary plot of an exemplary communication signal with unwanted signal components after a first method of receiver amplification adjustment.
Figure 5B:
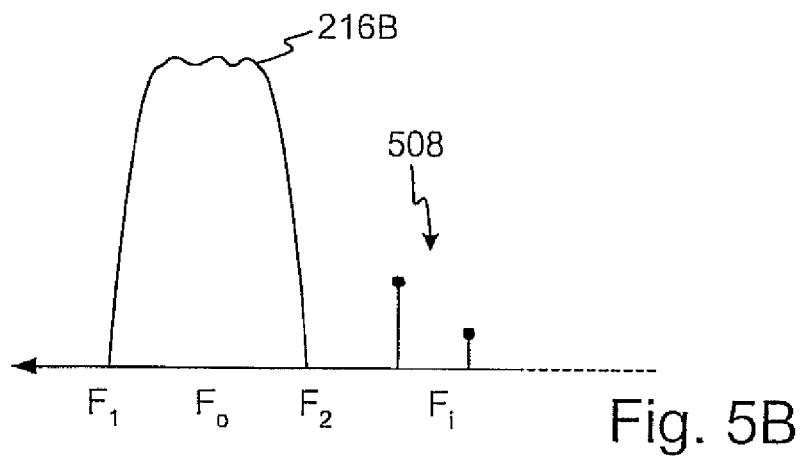
FIG. 5B illustrates an exemplary plot of an exemplary communication signal with unwanted signal components after a second method of receiver amplification adjustment.

FIGS. 4, 5A and 5B, discussed in conjunction with FIG. 3, are helpful in providing a more detailed description of this operation. FIG. 4, illustrates an example plot of an exemplary communication signal with unwanted signal components before and after demodulation. A horizontal axis 208 represents frequency while a vertical direction represents signal amplitude. The frequency passband 212 of the filter 308 is shown by the band between $F_{LF}$ and $F_{HF}$. The desired signal 216A, modulated at the carrier frequency, lies between $F_{C1}$ and $F_{C2}$. Unwanted signal interference 220A is located within the passband 212 of the filter at a frequency $F_{ci}$.

After demodulation by the mixer 330A, 330B, the desired signal 216B resides at baseband between frequencies $F_1$ and $F_2$. However, the unwanted signal components 220B are also present and reside at a frequency $F_i$. As the interference signals 220B are second order products, mixer operation may cause the interference signals 220B to become significant as compared to the desired signal 216B. Further, depending on their relative offsets to one another and the desired signal, they may be translated to a frequency which falls between F1 and F2, i.e., directly within the baseband signal.

In one embodiment of the invention, the DSP 350 controls the LNA 312 to slightly increase its gain level. In one embodiment the level of increase is 1 dB. Concurrently, the DSP 350 may optionally reduce the level of gain in the AGC 334A, 334B to accommodate ADC 342A, 342B. In one embodiment the level of reduction by the AGC 334A, 334B is inversely proportional to the gain increase in the LNA 312. In one embodiment the level of reduction is 1 dB. In one embodiment the AGC 334A, 334B will automatically decrease its level of gain to account for the change in LNA 312 gain. In one embodiment only the gain of LNA 312 is adjusted.

FIG. 5A illustrates an exemplary plot of an exemplary communication signal with unwanted signal components after adjustment of receiver amplifier settings. As can be seen by comparison of FIG. 5A to FIG. 4, in response to the increase in LNA gain the interference signals 504 has increased in magnitude relative to the desired signal 216B. This occurs because increasing the gain of the LNA 312 causes a greater signal level to be passed to the demodulator where the second order interference signals are generated within the mixer. Second order signals will increase by the square of the gain increase in the RF stage, whereas the desired signal 216B will only increase proportionally to the gain increase. As a result of the increased presence or magnitude of the interference signal 504, the BER will increase. In contrast, if the high BER is caused by an aspect other than the interference signal 504 then the change in gain level will not yield a change in the BER. In this manner the reason or cause of the high error rates may be determined. Depending on the spacing between the jammers 220A, it is possible that they could be translated to a range of frequencies which lie directly between F1 and F2 results in severe disruption to the desired signal.

In an alternative embodiment the above described analysis is achieved by decreasing the gain of the LNA 312 and increasing the gain in the AGC 334A, 334B. Because a lower level of gain is occurring in the RF stage the signals passed to the demodulator where the second order interference signals 504 are generated will decrease by the square of the gain decrease in the RF stage, whereas the desired signal 216B will only decrease proportionally to the gain increase. As a result of the decreased presence or magnitude of the interference signal 504, the BER will decrease. FIG. 5B illustrates an exemplary plot of an exemplary communication signal with unwanted signal components after alternative adjustment of receiver amplifier settings. As shown the interference signal 508 is reduced as compared to the desired signal 216B. Thus, the reduction the interference signal 508 and thus the BER, indicates the cause of the high BER is from interference signals. In contrast, if the high BER is caused by an aspect other than the interference signal 220B then the change in gain level will not yield a change in the BER. In this manner the contributing factor or reason for the high error rate may be determined.

It is contemplated that in various embodiments only the LNA gain may be adjusted or only the AGC gain may be adjusted. It is further contemplated that both the LNA gain and the AGC may be adjusted either by increasing the LNA gain while decreasing the AGC gain or by decreasing the LNA gain while increasing the AGC gain.

In another embodiment the above-described method and apparatus for determining the cause of the high error rate is combined with a method and apparatus to selectively improve receiver operation to thereby reduce affects of the interference signal. In reference to FIG. 3, upon detection that the BER has exceeded a predetermined level, such as a first threshold, the DSP 350 may send a signal, such as a control signal or current signal, to the mixers 330A, 330B. Increasing the current supplied to the mixers 330A, 330B improves mixer operation during an overload situation such as when receiving an interference signal 220. With the increased current the mixer input intercept point for second order products is improved and the error rate will decrease. During a period of increased current operation the error rate can be periodically or intermittently monitored such as by comparison to a second threshold. If the monitoring reveals that the interference signals are no longer generating an acceptably high error rate then the current provided to mixer 330A, 330B may be reduced to prior levels to reduce power consumption. Hence, in one embodiment the receiver is configured to only operate the mixer in a high current state during periods when the error rate is high and only when the high error rate is caused by second order blocking signals, such as caused by interference signals. In one embodiment the BER is monitored to determine when to reduce the current level used for mixer operation. FIG. 7, described below, discusses this operation in more detail.

Figure 8A:
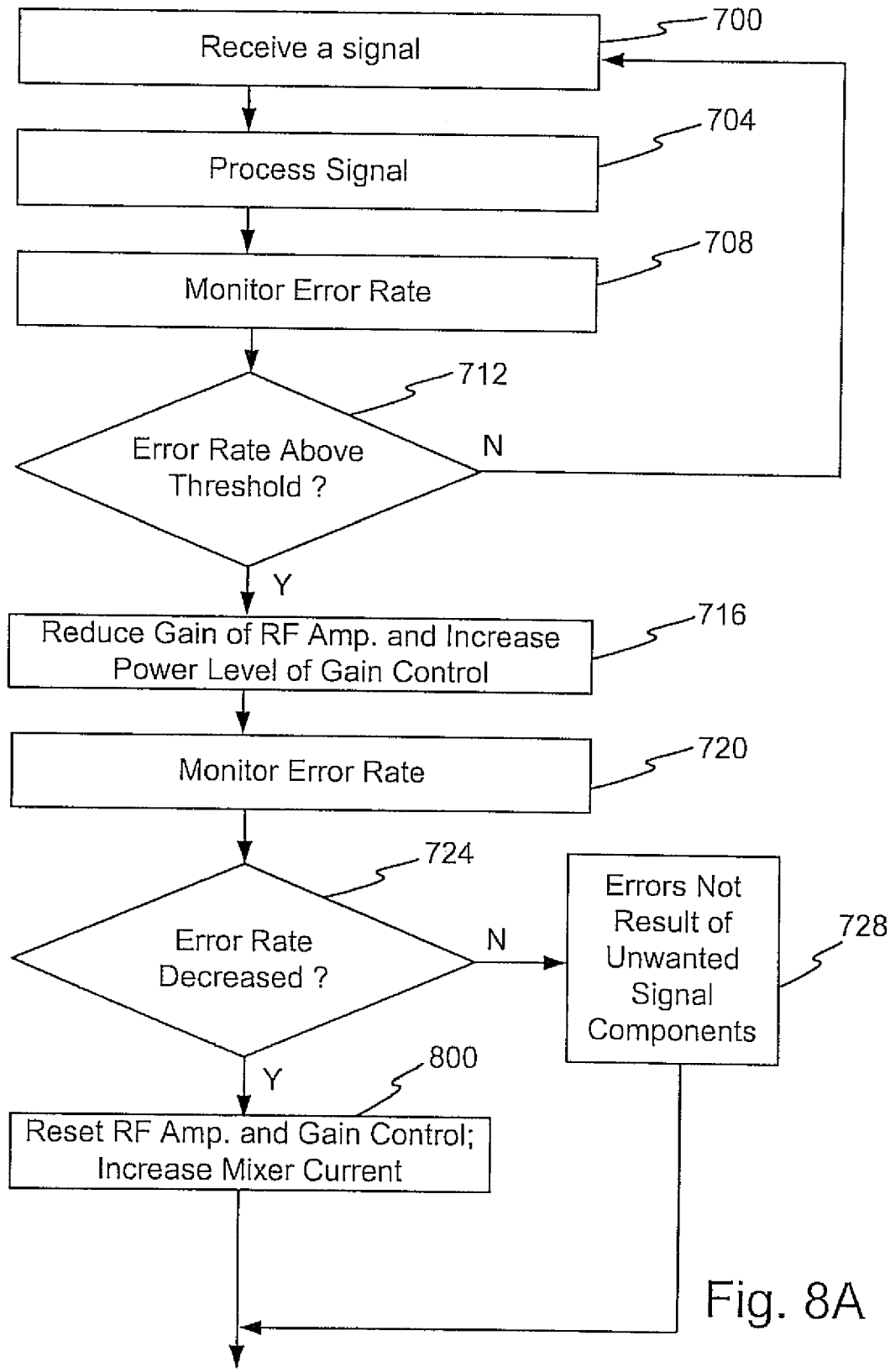
FIGS. 8A and 8B illustrates an operational flow diagram of an alternative method of selective error reduction.
Figure 8B:
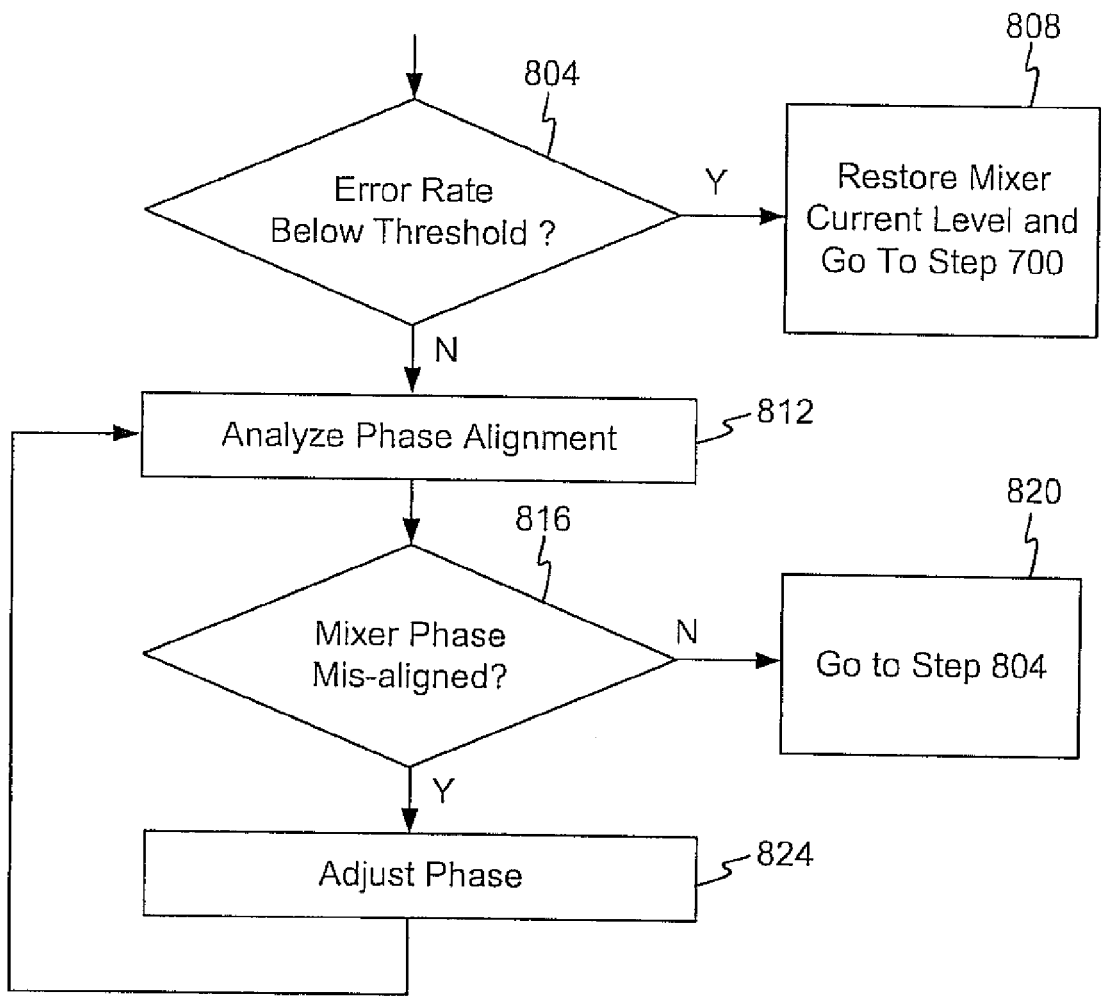

In another embodiment a method and apparatus is provided to reduce the error rate and improve receiver operation. In reference to FIG. 3, the DSP 350 monitors for and detects a high error rate. Upon detection of an undesirably high error rate the DSP 350 may monitor and adjust the operation of one or more of the splitter 320, the mixer 330A, 330B and the AGC 334A, 334B to insure that the internal balanced signal output of each mixer has the appropriate phase difference (typically 180 degrees) and that the phase offset between the upper path and lower path (I and Q components) is 90 degrees. If the phase difference at each individual mixer output is other than 180 degrees, the second order products may not be entirely canceled and instead passed to amplifiers 330A and 330B. FIGS. 8A and 8B describes this operation, in conjunction with the method of FIG. 7 in more detail.

Figure 6:
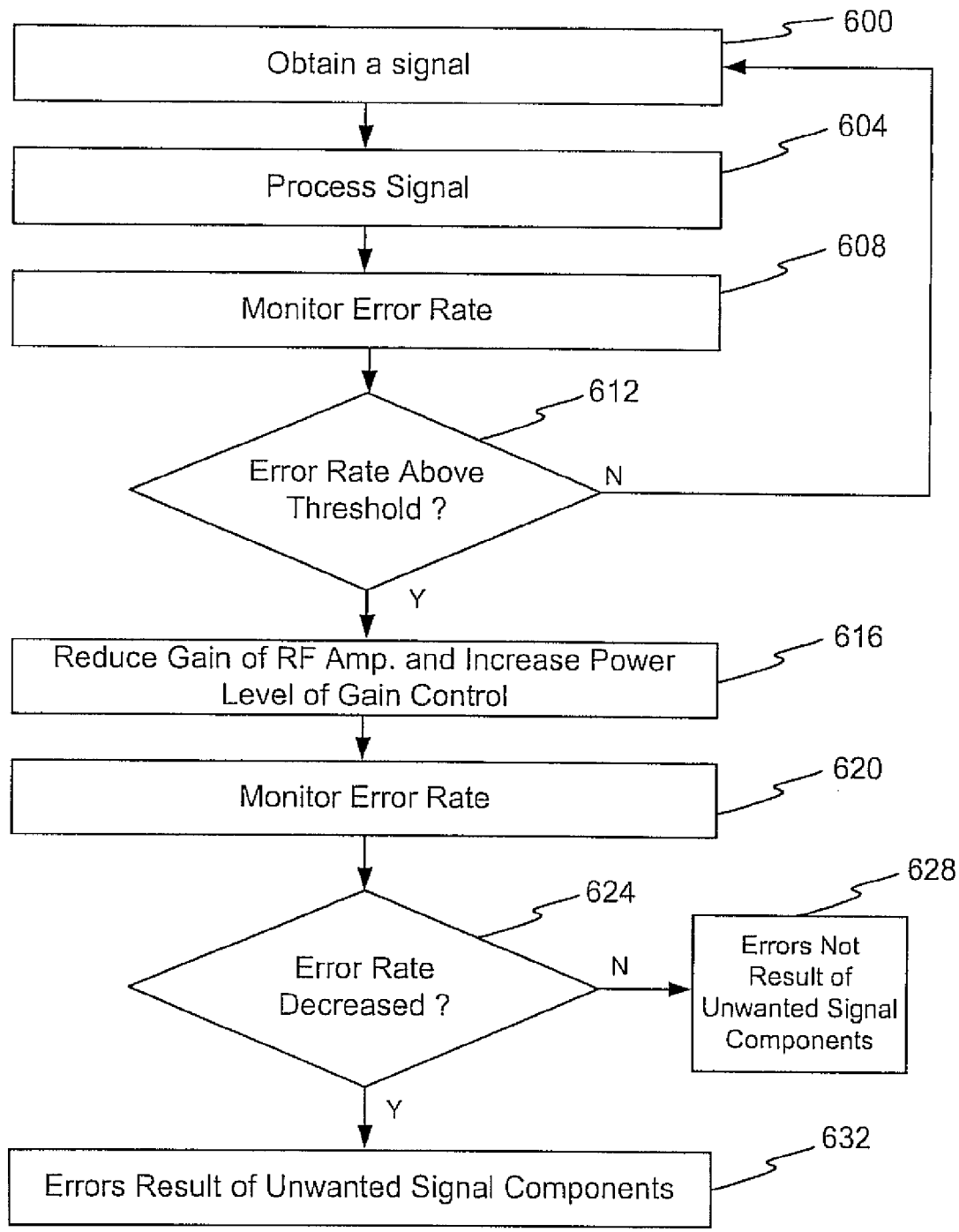
FIG. 6 illustrates an operational flow diagram of an example method of error analysis.

FIG. 6 illustrates an operational flow diagram of an example method of determining a cause of errors in a received signal. This is but one exemplary method of determining the cause of error in a received signal. It is contemplated that other methods of operation may be enabled by one of ordinary skill in the art without departing from the scope of the claims. At a step 600 the receiver obtains a signal. Any type of signal may be received or obtained and the system may comprise any type of wireless or non-wireless system. In one embodiment the system comprises a receiver in a cellular telephone. In one embodiment the receiver comprises a direct conversion receiver operating under the principles of code division multiple access (CDMA) technology. After receiving the signal the receiver at step 604, processes the signal according to the standard operation of the receiver. Any type processing may occur.

At a step 608 the receiver monitors the error rate. In one embodiment the bit error rate (BER) is monitored by a digital signal processor (DSP). Thereafter, at decision step 612 a comparison occurs between the monitored BER and a threshold value. In one embodiment a DSP performs the comparison. The threshold value may comprise a predetermined value above which error decreasing actions may be taken to reduce the error rate. The threshold value may comprise a predetermined value at which a determination is made regarding the cause of the high error rate. If the error rate is not above the threshold then the operation returns to step 600.

Alternatively, if at decision step 612 the operation determines that the error rate is above the threshold then the operation advances to a step 616. At step 616 the receiver, reduces the gain to the RF amplifier and increases the gain of the baseband amplifier. In one embodiment this comprises reducing the gain of a low noise amplifier and increasing the gain of an AGC unit. In an alternative embodiment only the gain of the LNA is adjusted.

At a step 620 the receiver monitors the error rate. Based on the monitoring of step 620 at a decision step 624 a determination is made whether the error rate decreased. If at decision step 624 the rate has not gone down, then at step 628 a determination can be made that the cause of the error rate is not a result of unwanted signal components, an interference signal and/or second order blocking signals. Alternatively, if at decision step 624 it is determined that the error rate decreased then at step 632 a determination can be made that the high error rate is a result of an interference signal and/or second order blocking signals. Thus the method provides means to determine one or more causes of a high error rate.

FIG. 7 illustrates an operational flow diagram of an example method of selectively improving receiver performance. This is but one exemplary method of reducing the error rate associated with a received signal. It is contemplated that other methods of operation may be enabled by one of ordinary skill in the art without departing from the scope of the claims. At a step 700 the receiver receives a signal and at a step 704 the receiver processes the signal. In one embodiment the processing yields an error rate, such as a bit error rate. At a step 708 the operation monitors the error rate. Based on the monitoring a determination is made whether the error rate is above the threshold or below the threshold. This occurs at a decision step 712.

If at decision step 712 the error rate is not above the threshold then the operation returns to step 700 and the receiver continues receiving and monitoring the received signal. Alternatively, if at decision step 712 the error rate is above the threshold then the operation advances to a step 716. At step 716 the receiver reduces the gain of the RF amplifier and increases the gain of the baseband amplifier. In one embodiment any permutation of RF amplifier gain adjustment and baseband amplifier gain adjustment may occur. The baseband amplifier gain may or may not be adjusted. The receiver again monitors the error rate at step 720. At a decision step 724 a determination is made regarding if the error rate changed after the changes made at step 716. If the error rate did not change then the determination can be made, at a step 728, that the high error rate is not a result of unwanted signal components. The operation then returns to step 700.

In contrast, if at decision step 724 the system determines that the error rates decreased then the operation progresses to a step 732. At step 732 any action or modification to receiver operation may occur to reduce the error rate. As can be understood it is desirable to first determine the cause of the high error rate and thereafter take action tailored to reduce the error rate. In the example method of operation shown in FIG. 7, at step 732 the amount of current supplied to the mixer is increased and receiver operation is continued. Increasing the amount of current supplied to the mixer will reduce second order products and thereby reduce the error rate. This is but one possible action that can be taken to reduce error.

It is generally understood that continued operation when the mixer is consuming high levels of current will reduce talk time and standby time. Accordingly at decision step 736 the system monitors if the error rate is sufficiently decreased so that the mixer current consumption may be restored to normal levels. Thus, if at decision step 736 the error rate is sufficiently reduced then the operation progresses to a step 744 wherein the mixer current is reset to normal levels. In one embodiment step 736 comprises comparison of the error rate to a second threshold. Thereafter the operation returns to step 700 for continued receiver operation. Alternatively, if at decision step 736 the error rate has not sufficiently been reduced, such as due to changing channel or interference conditions, then the operation progresses to a step 740. At step 740 the operation of the receiver continues with the current supply to the mixer maintained at a higher level. After step 740 the operation returns to step 736 and the monitoring continues. In this manner the mixer only operates in a state of high current consumption during periods when the error is undesirably high. Moreover the mixer only operates in a high current state when the high error rate can be remedied by operating the mixer in an increased current consumption state.

FIG. 8 illustrates an operational flow diagram of an alternative example method of selectively improving receiver performance. Since portions of FIG. 8 are generally similar to FIG. 7 only the differences in FIG. 8 are discussed below. Starting at a step 724, a determination is made whether the error rate is decreased as a result of the manipulation of step 716. Thereafter, the operation advances to step 724 or 728. At step 728 no action occurs while at step 800 the mixer current is increased to reduce the error rate. Thereafter, in the embodiment of FIG. 8B, the operation advances to a decision step 804. At decision step 804 another determination is made whether the error rate is below a threshold such as the second threshold. If the error rate is now sufficiently below the second threshold, the operation advances to step 808. At step 808 the mixer current is restored to normal levels and the operation returns to step 700.

Alternatively, if at step 804 the error rate is not sufficiently below a threshold value such as for example a second threshold value, then the operation advances to a step 812. At step 812 the receiver analyzes the phase alignment of the signal traveling through the upper and lower paths of the receiver. In one embodiment the signal is preferably 90 degrees out of phase. If the signals are not phase offset by the desired offset then error may occur. At a decision step 816 a determination is made whether the phase is mis-aligned. The DSP is able to compare the relative phases of the I and Q channels and adjust the phase and amplitude response as required. If it is determined that the phase is mis-aligned then the operation advances to step 824 and the receiver controls one or more components of the splitter or mixer to adjust the phase to the desired level of offset, also the amplitude if there is imbalance. Further there maybe phase imbalance within the phase splitter 320 itself. This imbalance will likely impair the IIP 2 of the demodulators 330A and 330B. To minimize this issue the DSP 350 may opt to incrementally shift the phase offsets of splitter 320 such that a 180 degree balance is maintained for signals 390. The direction of required incremental can be determined by measuring the difference between I and Q channels. Thereafter, the operation returns to step 812 and the operation is repeated until the proper phase offset is achieved. If at step 816 the phase is properly aligned then the operation advances to a step 820. At step 820 the operation returns to step 804. The monitoring continues in this manner.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A method for reducing a rate of error in an output of a receiver comprising:

calculating a rate of error associated with a received signal at a first time;

comparing the rate of error at the first time to a first threshold rate of error;

if the rate of error at the first time exceeds the first threshold rate of error, increasing current provided to a mixer in the receiver;

calculating a rate of error associated with a received signal at a second time;

comparing the rate of error at the second time to a second threshold rate of error; and if the rate of error at the second time is less than the second threshold rate of error, resetting the mixer current; and if the second rate of error is greater than the second threshold rate of error, adjusting phase offset between quadrature separated signals.

2. The method of claim 1 wherein the second threshold rate for error is less than the first threshold rate of error.

3. A method for reducing a rate of error in an output of a receiver comprising:

calculating a rate of error associated with a received signal at a first time;

comparing the rate of error at the first time to a first threshold rate of error;

if the rate of error at the first time exceeds the first threshold rate of error, adjusting amplification applied to the received signal;

calculating a rate of error associated with a received signal at a second time;

comparing the rate of error at the second time to the rate of error at the first time; and if the rate of error at the second time is less than the rate of error at the first time, increasing current provided to a mixer in the receiver.

4. The method of claim 3, further comprising:

calculating a rate of error associated with a received signal at a third time;

comparing the rate of error at the second time to the rate of error at the third time; and if the rate of error at the third time is less than the rate of error at the second time, resetting the mixer current.

5. A system for reducing the bit error rate in a wireless receiver comprising:

a high frequency amplifier configured to amplify a received signal;

a mixer configured to demodulate the amplified signal to create a baseband signal;

a sampling unit configured to convert an adjusted baseband signal into a digital signal;

an error detection unit configured to process the digital signal to calculate a rate of error associated with the received signal at a first time; and a controller configured to compare the rate of error at the first time to a first threshold rate of error, wherein if the rate of error at the first time exceeds the first threshold rate of error, then increased current is provided to the mixer;

the error detection unit configured to calculate a rate of error associated with the received signal at a second time; and the controller configured to compare the rate of error at the second time to a second threshold rate of error, wherein if the rate of error at the second time is less than the second threshold rate of error, then resetting the mixer current, and if the second rate of error is greater than the second threshold rate of error, then adjusting phase offset between quadrature separated signals.

* * * * *